US012594960B2

(12) United States Patent     (10) Patent No.:   US 12,594,960 B2

Tam et al.     (45) Date of Patent:     Apr. 7, 2026

(54) NAVIGATIONAL CONSTRAINT CONTROL SYSTEM

(71) Applicant: NISSAN NORTH AMERICA, INC., Franklin, TN (US)

(72) Inventors: Qizhan Tam, San Jose, CA (US); Christopher Ostafew, Mountain View, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 284 days.

(21) Appl. No.: 18/052,511

(22) Filed: Nov. 3, 2022

(65) Prior Publication Data

US 2024/0149912 A1     May 9, 2024

(51) Int. Cl.
    *B60W 60/00*     (2020.01)
    *B60W 10/20*     (2006.01)
    (Continued)

(52) U.S. Cl.
    CPC ........ *B60W 60/0011* (2020.02); *B60W 10/20* (2013.01); *B60W 30/09* (2013.01);
    (Continued)

(58) Field of Classification Search
    CPC .. B60W 60/0011; B60W 10/20; B60W 30/09;
              B60W 30/0956; B60W 40/105;
    (Continued)

(56) References Cited

U.S. PATENT DOCUMENTS 10,928,820 B1 *   2/2021   Tao ................. B60W 60/00274
2011/0320163 A1 *   12/2011   Markkula ........... B60W 40/072
                                        702/150

(Continued)

FOREIGN PATENT DOCUMENTS

WO     WO-2018225493 A1 *   12/2018  .............. G08G 1/09

OTHER PUBLICATIONS

Z. V. Ilyichenkova, et al, "Trajectory Correction of Autonomous Objects in the Presence of Restrictions," 2022 Systems of Signals Generating and Processing in the Field of on Board Communications, Moscow, Russian Federation, 2022, pp. 1-4, doi: 10.1109/IEEECONF53456.2022.9744288. (Year: 2022).*

(Continued)

*Primary Examiner* — Helal A Algahaim
*Assistant Examiner* — Merritt E Levy
(74) *Attorney, Agent, or Firm* — Spencer Fane, LLP

(57) ABSTRACT

A vehicle includes a vehicle engine, a steering control unit, an on-board sensor network and a navigational constraint control system. The vehicle engine generates a torque output of the vehicle. The steering control unit controls a steering angle of the vehicle. The on-board sensor network is programmed to detect external objects within a detection zone. The navigational constraint control system has a memory for storing a path index for the vehicle's navigation. The processor is programmed to determine a reference trajectory from the path index. The processor is further programmed to calculate navigational constraints for the determined reference trajectory to determine a nominal trajectory based on information detected by the on-board sensor network. The processor is programmed to control at least one of the vehicle engine and the steering control unit in accordance with the nominal trajectory.

20 Claims, 10 Drawing Sheets

(51) Int. Cl.
   *B60W 30/09* (2012.01)
   *B60W 30/095* (2012.01)
   *B60W 40/105* (2012.01)

(52) U.S. Cl.
   CPC ...... *B60W 30/0956* (2013.01); *B60W 40/105* (2013.01); *B60W 2556/20* (2020.02); *B60W 2556/50* (2020.02); *B60W 2710/0666* (2013.01); *B60W 2710/207* (2013.01)

(58) Field of Classification Search
   CPC ......... B60W 2556/20; B60W 2556/50; B60W 2710/0666; B60W 2710/207; B60W 30/18163
   USPC .......................................................... 701/23
   See application file for complete search history.

(56) References Cited

U.S. PATENT DOCUMENTS

| | | | | |
|---|---|---|---|---|
| 2018/0017971 | A1* | 1/2018 | Di Cairano | B62D 15/0265 |
| 2018/0231974 | A1* | 8/2018 | Eggert | B60W 30/085 |
| 2018/0251126 | A1* | 9/2018 | Linscott | G05D 1/0055 |
| 2018/0356819 | A1* | 12/2018 | Mahabadi | B60W 30/00 |
| 2019/0086924 | A1* | 3/2019 | Greenfield | G05D 1/0088 |
| 2019/0315357 | A1* | 10/2019 | Zhang | G05D 1/0238 |
| 2019/0329768 | A1* | 10/2019 | Shalev-Shwartz | G05D 1/65 |
| 2021/0027629 | A1* | 1/2021 | Tao | G08G 1/052 |
| 2021/0031760 | A1* | 2/2021 | Ostafew | G05D 1/0088 |
| 2022/0135039 | A1* | 5/2022 | Jardine | B60W 30/18159 701/26 |
| 2022/0281456 | A1* | 9/2022 | Giovanardi | B60W 30/09 |
| 2022/0315051 | A1* | 10/2022 | Patel | B60W 60/0011 |
| 2023/0021615 | A1* | 1/2023 | Inaba | B60T 7/22 |
| 2023/0192147 | A1* | 6/2023 | Raina | G01C 21/3804 701/23 |
| 2023/0322259 | A1* | 10/2023 | Sadek | G01C 21/32 701/23 |
| 2023/0406348 | A1* | 12/2023 | Kabzan | B60W 60/00 |

OTHER PUBLICATIONS

X. Li, Z. Sun, D. et al., "Combining local trajectory planning and tracking control for autonomous ground vehicles navigating along a reference path," 17th International IEEE Conference on Intelligent Transportation Systems (ITSC), Qingdao, China, 2014, pp. 725-731, doi: 10.1109/ITSC.2014.6957775. (Year: 2014).*

K. Berntorp, R. Bai, K. F. Erliksson, C. Danielson, A. Weiss and S. D. Cairano, "Positive Invariant Sets for Safe Integrated Vehicle Motion Planning and Control," in IEEE Transactions on Intelligent Vehicles, vol. 5, No. 1, pp. 112-126, Mar. 2020, doi: 10.1109/TIV. 2019.2955371. (Year: 2020).*

P. R. Klarer, "Autonomous and navigation in a structured environment," Conference Proceedings., IEEE International Conference on Systems, Man and Cybernetics, Cambridge, MA, USA, 1989, pp. 334-337 vol. 1, doi: 10.1109/ICSMC.1989.71312. (Year: 1989).*

* cited by examiner

FIG. 6

Nominal Trajectory after all constraints are applied.

Lateral Constraints

▨ Lateral + Longitudinal constraints
▨ Lateral constraints
△ Stationary Detected Hazard
△ Stationary Virtual Hazard
☐ Detected Moving Hazard
☐ Prediction of Detected Moving Hazard

NAVIGATIONAL CONSTRAINT CONTROL SYSTEM

BACKGROUND

Technical Field

The present disclosure generally relates to a navigational constraint control system. More specifically, the present disclosure relates to a navigational constraint control system for a vehicle.

Background Information

Autonomous or semi-autonomous vehicles can accelerate, decelerate, change lanes or alter navigation course and stop without human intervention. Autonomous and semiautonomous vehicles can keep in the desired lane, and can potentially also be able to park themselves.

SUMMARY

In view of the state of the known technology, one aspect of the present disclosure is to provide a vehicle comprising a vehicle engine, a steering control unit, an on-board sensor network and a navigational constraint control system. The vehicle engine generates a torque output of the vehicle. The steering control unit controls a steering angle of the vehicle. The on-board sensor network is programmed to detect external objects within a detection zone. The navigational constraint control system has a memory for storing a path index for the vehicle's navigation. The processor is programmed to determine a reference trajectory from the path index. The processor is further programmed to calculate navigational constraints for the determined reference trajectory to determine a nominal trajectory based on information detected by the on-board sensor network. The processor is programmed to control at least one of the vehicle engine and the steering control unit in accordance with the nominal trajectory.

In view of the state of the known technology, another aspect of the present disclosure is to provide a method for controlling a vehicle based on navigational constraints. The method comprises detecting a presence of external objects within a detection zone by an on-board sensor network. The method further comprises determining a reference trajectory by a processor from a prestored path index. The method further comprises calculating navigational constraints for the determined reference trajectory based on information detected by the on-board sensor network to determine a nominal trajectory by the processor. The method further comprises controlling at least one of a vehicle engine and a steering control unit in accordance with the nominal trajectory.

BRIEF DESCRIPTION OF THE DRAWINGS

Referring now to the attached drawings which form a part of this original disclosure:

FIG. 6 is a schematic view of information that can be stored in a computer memory of the navigational constraint control system;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
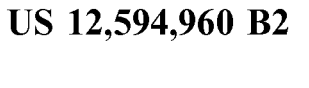
FIG. 1 is a schematic plan view of a vehicle equipped with a navigational constraint control system in accordance with an illustrated embodiment.
Figure 2:
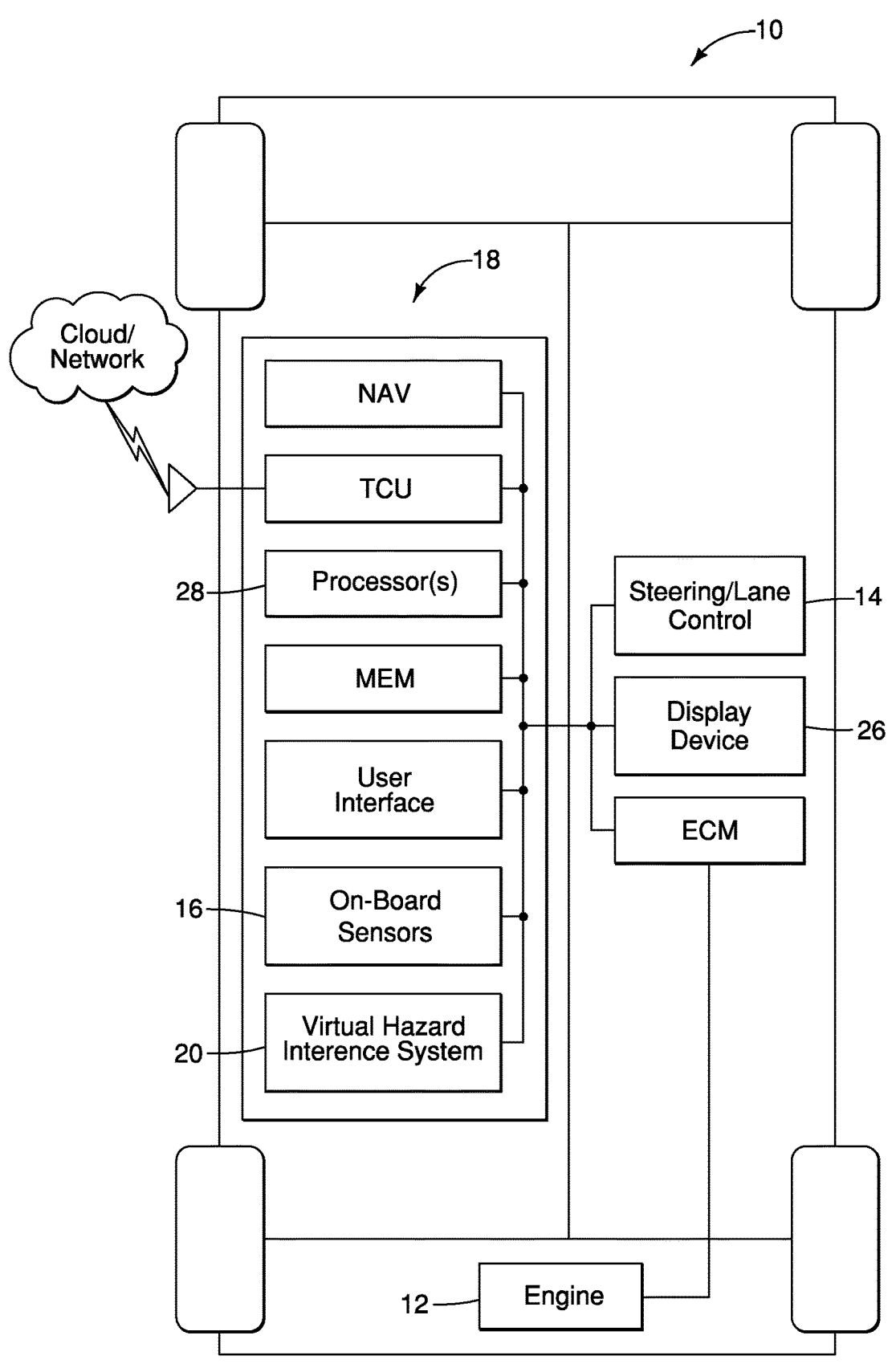
FIG. 2 is schematic view of the components of the navigational constraint control system of the vehicle.

Referring initially to FIG. 1, a vehicle 10 is schematically illustrated as being equipped with a vehicle engine 12, a steering control unit 14, and an on-board sensor network 16. In the illustrated embodiment, the vehicle 10 is further equipped with an on-board satellite navigation device NAV and a telematics control unit TCU, as best seen in FIGS. 1 and 2. The telematics control unit TCU is in wireless communications with a cloud services and/or a vehicle network to upload and receive crowdsourced information regarding conditions near the vehicle's 10 vicinity.

The vehicle 10 is further equipped with a navigational constraint control system 18 in accordance with the illustrated embodiment. The vehicle 10 preferably further includes a virtual hazard inference system 20. Together, the navigational constraint control system 18 and the virtual hazard inference system 20 operate to control the vehicle engine 12 and the steering control unit 14, as will be further described below. In particular, the navigational constraint control system 18 is programmed to control the vehicle engine 12 and the steering control unit 14 based on information received from the on-board sensor network 16, the on-board satellite navigation device NAV, the telematics control unit TCU and the virtual hazard inference system 20.

The on-board satellite navigation device NAV and the telematics control unit TCU are considered examples of control modules for navigation assistance. The on-board sensor network 16 monitors both internal and external conditions of the vehicle 10. That is, the on-board sensor network 16 includes internal sensors 16A to monitor conditions regarding the vehicle 10 interior, such as the vehicle's 10 passenger compartment. The on-board sensor network 16 further includes environmental sensors 16B that monitor conditions regarding the vehicle 10 vicinity, as will be further discussed below.

For example, the vehicle 10 can be equipped with one or more unidirectional or omnidirectional external cameras that take moving or still images of the vehicle 10 surroundings. In addition, the external cameras can be capable of detecting the speed, direction, yaw, acceleration and distance of the vehicle 10 relative to a remote object. The environmental sensors 16B can also include infrared detectors, ultrasonic detectors, radar detectors, photoelectric detectors, magnetic detectors, acceleration detectors, acoustic/sonic detectors, gyroscopes, lasers or any combination thereof. The environmental sensors 16B can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the environmental sensors 16B can be used to determine information about the vehicle's 10 vicinity, as will be further described below.

Preferably, the internal sensors 16A preferably includes at least one internal unidirectional or omnidirectional camera positioned to detect behavior of one or more passengers in the passenger compartment. The on-board sensor network 16 can include one or more microphone(s). The on-board sensor network 16 detects a region of interest ROI for the vehicle 10. The region of interest ROI includes an area within a reference trajectory 22 of the vehicle 10, and the areas adjacent to and within the vicinity of the reference trajectory 22.

The reference trajectory 22 is considered a navigation path of the vehicle 10. In the illustrated embodiment, the navigational constraint control system 18 is programmed to update the reference trajectory 22 to a modified or a nominal trajectory 24 based on navigational uncertainties and navigational constraints, as will be further discussed. The navigation uncertainties and navigational constraints will be determined based on information received from any or all of the on-board sensor network 16, the on-board satellite navigation device NAV, the telematics control unit TCU and the virtual hazard inference system 20.

The on-board sensor network 16 is programmed to detect external objects E within a detection zone (e.g., the region of interest ROI). In the illustrated embodiment, for simplicity, the region of interest ROI is illustrated to correspond to the detection zone that is detected by the on-board sensor network 16. However, it will be apparent to those skilled in the vehicle field from this disclosure that the region of interest ROI can include areas beyond the detection zone of the on-board sensor network 16.

The vehicle 10 is preferably further equipped with an electronic display device configured to display the reference trajectory 22 and the region of interest ROI to the driver. The electronic display device is positioned in an interior compartment of the vehicle 10. The electronic display device is in communication with the navigational constraint control system 18 of the illustrated embodiment. The electronic display device can be a display screen (such as a navigational screen) positioned on the vehicle's 10 dashboard. The electronic display device can alternatively be a mobile device screen.

That is, the navigational constraint control system 18 includes an electronic control unit ECU for controlling the electronic display device to display the reference trajectory 22 and the region of interest ROI. In particular, the ECU includes one or more processor(s) 28 for controlling the operation of the virtual hazard inference system 20 of the vehicle 10, as will be further described. Therefore, the navigational constraint control system 18 includes one or more processor(s) 28 for controlling the components of the navigational constraint control system 18.

The vehicle engine 12 generates a torque output of the vehicle 10 in accordance with the operation of the vehicle pedal (not shown) by the driver. The vehicle engine 12 generates a torque output that is created by the pistons within the engine 12 as they reciprocate up and down along the engine's 12 crankshaft. The torque output generated by the engine 12 is then transferred to the vehicle's 10 wheels through the vehicle's 10 transmission and drivetrain.

The vehicle engine 12 is further equipped with an engine control unit ECM. In particular, the ECM controls a torque output of the vehicle engine 12. The ECM monitors the sensors in the vehicle's 10 engine bay (not shown) in order to manage the vehicle's 10 air-fuel mixture and regulate the emissions control of the engine 12, such as the air-fuel ratio, idle speed, variable valve timing, ignition timing, etc. The on-board sensor network 16 can further include mass airflow sensor(s), the oxygen sensor(s), air-fuel sensor(s) that are in connection with the ECM. The on-board sensor network 16 preferably further includes sensors located by the vehicle's 10 crankshaft and camshafts so that the ECM can determine the vehicle's 10 idle speed, or the revolutions per minute (RPM) and engine 12 load.

The vehicle 10 can include an internal combustion engine. Alternatively, the vehicle 10 can be a hybrid or an electric vehicle, or be operated by a hydrogen powertrain. Therefore, the ECM and the torque control operation described herein can be provided for any of these types of vehicles.

In the illustrated embodiment, the vehicle engine 12, a steering control unit 14, and the on-board sensor network 16 are all part of the navigational constraint control system 18. In addition, the virtual hazard inference system 20 is part of the navigational constraint control system 18 of the illustrated embodiment.

Preferably, the on-board sensor network 16 also includes a vehicle speed sensor and a torque sensor. The vehicle speed sensor is capable of measuring the vehicle's 10 transmission output or can measure wheel speed in a conventional manner. Therefore, the vehicle speed sensor is configured to detect a current speed of the vehicle 10. The torque sensor can be a torque transducer that is capable of measuring and monitoring the torque on a rotating system, such as the engine's 12 crankshaft. The torque sensor can convert a torsional mechanical input into an electrical output signal. Therefore, the torque sensor is configured to detect a current torque of the vehicle 10. In the illustrated embodiment, the vehicle speed sensor and the torque sensor are in electrical communication with the ECM to send and receive signals to and from the ECM. These sensors controlled by the ECM can be considered part of the internal sensors 16A of the on-board sensor network 16.

The vehicle 10 is further equipped with a steering control unit 14 that controls a steering angle of the vehicle 10. The steering control unit 14 includes an electronic controller that uses steering angle, acceleration, vehicle speed, and brake commands so that the vehicle 10 follows the reference trajectory 22 and the nominal trajectory 24. The steering control unit 14 can be part of an intelligent Advanced Driver Assistance System (ADAS) that helps the driver through a human-machine interface by following the lane departure warning system, a Lane Keeping Assistance System (LKAS), a Forward Collision Warning System, and/or a Smart Parking Assistant System (SPAS).

The steering control unit 14 can additionally be a motor-driven power steering (MDPS) system that can produce heavier steering effort depending on the increase in vehicle speed. The MDPS system reduces a driver's effort by providing assist torque and return torque based on an electric motor.

The steering control unit 14 is a path tracking system that controls a steering actuator (not shown) based on the current vehicle's 10 position, heading information, and reference path from the NAV and/or the TCU. The steering control unit 14 controls the steering actuator to follow the reference trajectory 22 which serves as a reference path for vehicle travel. In the illustrated embodiment, the processor(s) 28 controls the vehicle engine 12 and the steering control unit 14 to perform at least one of a torque control operation and a steering control operation. In particular, the processor(s) 28 of the navigational constraint control system 18 controls the torque output and the steering of the vehicle 10 based navigation uncertainties and navigational constraints, as will be further described below.

Referring again to FIGS. 1 and 2, the vehicle's 10 control modules for navigation assistance will now be further discussed. The NAV is in communication with a global positioning system unit (GPS) to acquire real-time information regarding conditions near the vehicle's 10 vicinity. In particular, the on-board satellite navigation device NAV is in communication with the global positioning system unit GPS to acquire real-time information regarding conditions near the vehicle's 10 vicinity. The on-board satellite navigation device NAV can be a global navigation satellite system (GNSS) receiver or GPS receiver that is capable of receiving information from GNSS satellites then calculate the device's geographical position. Therefore, the on-board satellite navigation device NAV acquires GPS information for the vehicle 10.

As shown in FIG. 2 the on-board satellite navigation device NAV can also be in communication with a Wide Area Augmentation System (WAAS) enabled National Marine-Electronics Association (NMEA) unit, a radio triangulation unit, or a combination thereof. The on-board satellite navigation device NAV can obtain information that represents, for example, a current heading of the vehicle 10, a current position of the vehicle 10 in two or three dimensions, a current angular orientation of the vehicle 10, or a combination thereof. In this way, the on-board satellite navigation device NAV captures real-time information regarding conditions regarding the vehicle's 10 vicinity.

In the illustrated embodiment, the navigational constraint control system 18 is controlled by the processor(s) 28. The processor(s) 28 can include any device or combination of devices capable of manipulating or processing a signal or other information now-existing or hereafter developed, including optical processors, quantum processors, molecular processors, or a combination thereof. For example, the processor(s) 28 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof.

As used herein, the terminology "processor(s) 28" indicates one or more processor(s), such as one or more special purpose processor(s), one or more digital signal processor(s), one or more microprocessor(s), one or more controllers, one or more microcontrollers, one or more application processor(s), one or more Application Specific Integrated Circuits, one or more Application Specific Standard Products; one or more Field Programmable Gate Arrays, any other type or combination of integrated circuits, one or more state machines, or any combination thereof.

The navigational constraint control system 18 also includes a computer readable medium MEM that serves as a computer memory for the navigational constraint control system 18. As seen in FIG. 2, the processor(s) 28 is operatively coupled with the computer readable medium MEM, the sensor network 16, the TCU, the NAV, and the display device 22 (and preferably a user interface for the display device 22).

As used herein, the terminology "memory" or "computer-readable medium MEM" (also referred to as a processor-readable medium) indicates any computer-usable or computer-readable medium MEM or device that can tangibly contain, store, communicate, or transport any signal or information that may be used by or in connection with any processor(s) 28. For example, the computer readable medium may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The MEM can be programmed to store map data for the navigational constraint control system 18. For example, the MEM can store metric maps, tele-operated maps, and recorded reference trajectories from previous trips. The MEM can also store temporary data received from the on-board sensor network 16, such as perceived lane markings and traffic signs. This information stored in the MEM can be used by the processor(s) 28 to generate a reference trajectory 22 for the vehicle 10. Additionally, this data can be used as threshold data for estimating or changing the reference trajectory 22, as will be further described below.

The processor(s) 28 can execute instructions transmitted by one or more transmission media, including coaxial cables, copper wire and fiber optics, including the wires that comprise a system bus coupled to a processor(s) 28 of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by a processor(s) 28 to perform any of the respective methods, algorithms, aspects, or combinations thereof, as described herein. In some embodiments, instructions, or a portion thereof, may be implemented as a special purpose processor(s) 28, or circuitry, that may include specialized hardware for carrying out any of the methods, algorithms, aspects, or combinations thereof, as described herein. In some implementations, portions of the instructions may be distributed across multiple processor(s) 28 on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor(s) 28 receives instructions from the computer-readable medium MEM and executes these instructions, thereby performing one or more processes, including one or more of the processes described herein. Such instructions and other data may be stored and transmitted using a variety of computer-readable media.

For example, the processor(s) 28 can also use information from the environmental sensors 16B to identify, the type of road (e.g., type of lanes and lane segments, urban or highway), difficulty of traversal of lane(s) and lane segment(s), density of traffic, the level of the density, etc. In the illustrated embodiment, the processor(s) 28 is programmed to anticipate information regarding upcoming conditions near the vehicle 10 vicinity based on one or more of the real-time information received from the on-board satellite navigation device NAV, the crowdsourced information and the predetermined information (stored in the computer readable medium).

The non-transitory computer readable medium MEM stores predetermined information or threshold information for the navigational constraint control system 18. For example, the non-transitory computer readable medium MEM includes one or more database of road conditions or situations. The database can include a set of road feature parameters that can be applicable for almost all reference trajectories along a road feature or intersection (e.g., intersection type, ongoing traffic control(s), lane types and numbers, lane angles, etc.). The MEM also stores other information for the navigational constraint control system 18 as will be further described below.

As stated, the virtual hazard inference system 20 informs the navigational constraint control system 18 of virtual hazards that are occluded from detection by the on-board sensor network 16. The navigational constraint control system 18 can control the vehicle 10 and update the reference trajectory 22 based on this information.

In particular, the on-board sensor network 16 detects external objects E within the region of interest ROI, including hazards such as other vehicles, bicyclists and pedestrians. The virtual hazards V are also classified (e.g., classified as other vehicles, bicyclists and pedestrians). Therefore, the virtual hazard inference system 20 includes a hazard classifier for classifying the virtual hazards V and/or any detected hazards. The virtual hazard inference system 20 therefore includes computer memory (similar to the MEM) that includes a database of images for external objects (vehicles, bicyclists and pedestrians etc.) in order to classify the detected external objects E.

In the illustrated embodiment, the processor(s) 28 is programmed to update the reference trajectory 22 of the vehicle 10 based on one or more inferred virtual hazard(s) V within the region of interest ROI or the detected area. The virtual hazards V are external objects E to the vehicle 10 but are occluded from detection by the environmental sensors 16B, as will be further discussed below. That is, the virtual hazard inference system 20 "fills in" areas within the region of interest ROI that are occluded from detection by the on-board sensor network 16. The virtual hazard inference system 20 "fills in" these occluded areas with inferred virtual hazards V. Therefore, the virtual hazards V can include undetected external objects both within the detection zone and also outside of the vehicle's 10 detection zone but still within the vicinity of the vehicle 10. Therefore, in the illustrated embodiment, virtual hazards V includes external objects E not detected by the on-board sensor network 16 but may be in or in the vicinity of the vehicle's 10 region of interest ROI.

The inferred virtual hazard V is based on a determined probability of the presence of the virtual hazard V. In the illustrated embodiment, the probability of an occluded object or virtual hazard V increases as the number of occluded areas A increases. For example, in the case of city or heavily populated residential driving, the virtual hazard inference system 20 can infer that the virtual hazard V can be another vehicle due to the probability of congested vehicles in these driving conditions. If the density of detected parked vehicles reaches a prestored threshold (e.g., three or more within a ten meter square radius of the vehicle 10), the virtual hazard inference system 20 begins to "fill in" undetected space(s) or area(s) between detected parked vehicles with "virtual" parked vehicles.

Figure 7:
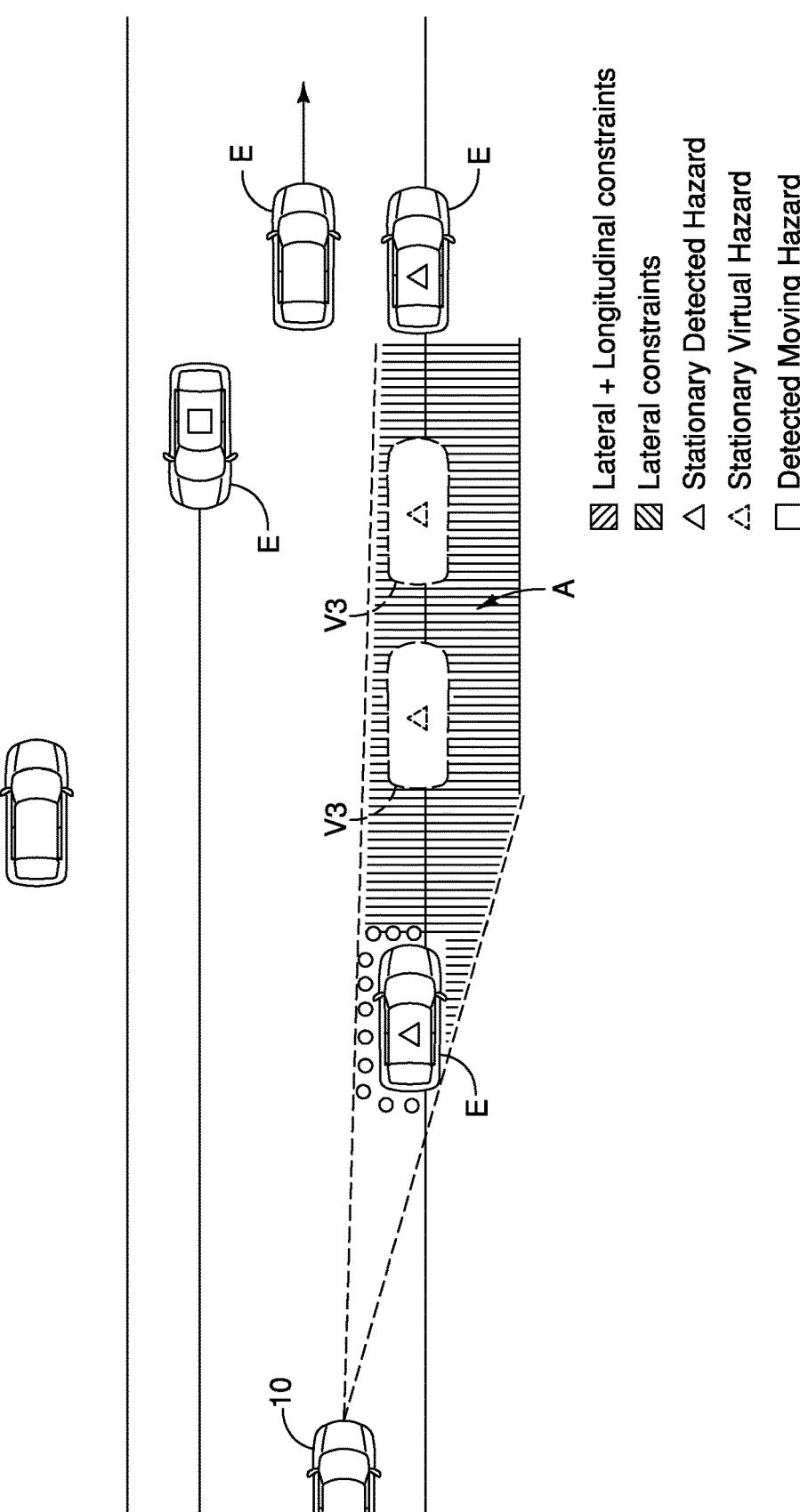
FIG. 7 is a schematic view of a first driving scenario encountered by the vehicle equipped with the navigational constraint control system.
Figure 8:
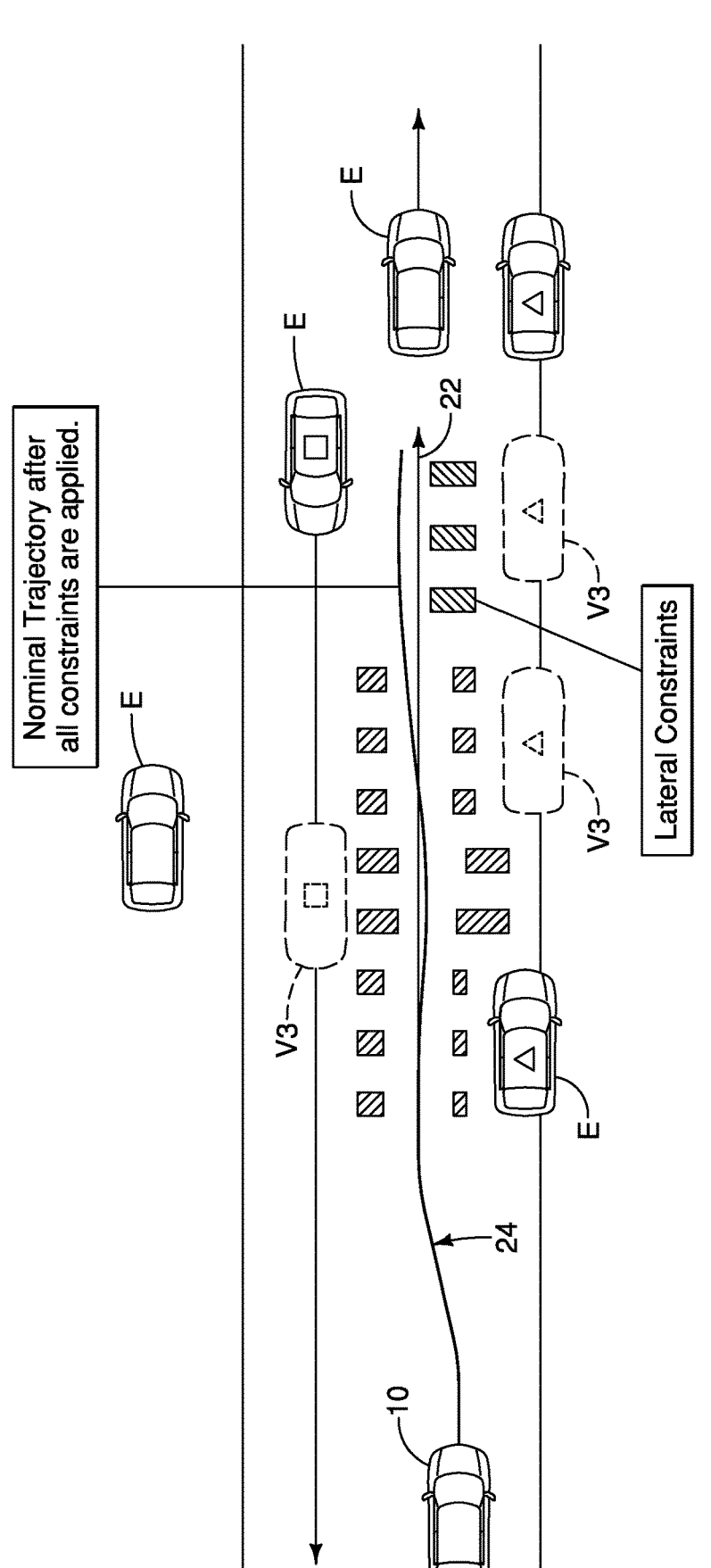
FIG. 8 is a schematic view of the first driving scenario encountered by the vehicle showing navigational constraints determined by the navigational constraint control system.

For example, as shown in FIG. 7, the virtual hazard inference system 20 can infer the presence of the vehicles V3 in the occluded area A based on the presence of the detected vehicles E. In the illustrated embodiment, the virtual hazard inference system 20 is programmed to "fill in" the occluded areas upon determining a prestored threshold has been reached, such as a predetermined a density of detected external objects E, such as a density of vehicles, pedestrians, bicyclists, etc. The processor(s) 28 of the navigational constraint control system 18 can then determine maximum and lateral deviations for the nominal trajectory 24 based on the inferred virtual hazards V inferred by the virtual hazard inference system 20, as seen in FIG. 8.

Figure 6:
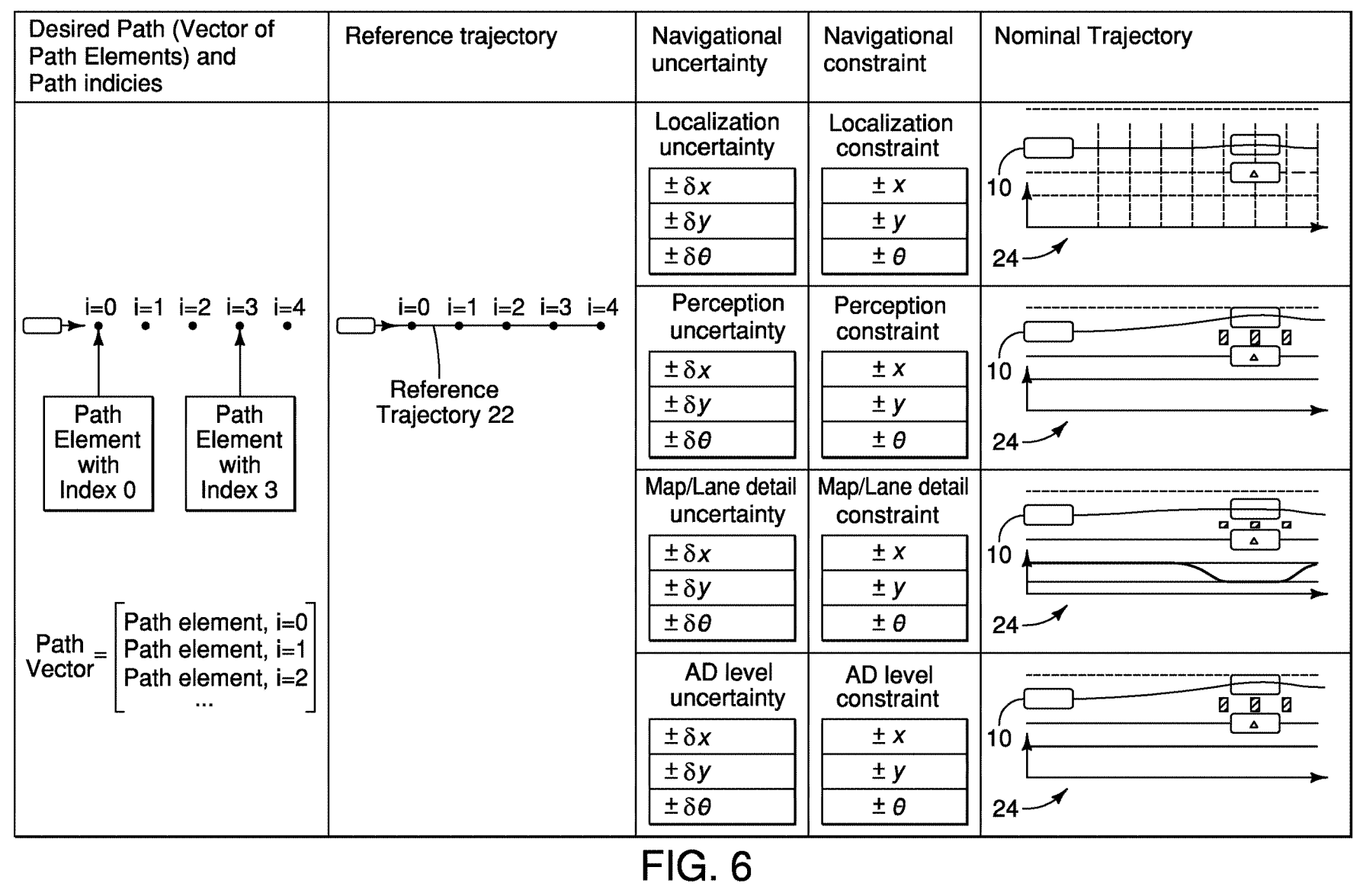

Referring now to FIG. 6, the primary functions/components of the navigational constraint control system 18 will now be discussed. In particular, a path represented by a series of path elements for the vehicle 10 is stored in the MEM. That is, the MEM can store a reference path that ultimately determines a reference trajectory 22 for the vehicle's 10 navigation. As best seen in FIG. 6, a sample reference trajectory 22 is illustrated based on elements of the vector. Therefore, the MEM can store values that determine the reference trajectory 22 of the vehicle 10. As such, the path indices stored in the MEM can refer to a specific elements of the reference path vector. The vector values consist of path elements, which are discretized points along the route that the steering control unit 14 follows. The vector values are preferably indexed sequentially, such that a vector value of i=0 corresponds to a first point in space for navigation control, followed by i=1, then i=2, etc. Sample information for the path index is shown in FIG. 6.

The processor(s) 28 of the navigational constraint control system 18 then determines the reference trajectory 22 for the vehicle 10 based on the vector values in the path index. Therefore, the processor(s) 28 is programmed to determine the reference trajectory 22 based on the values of the vectors in the path index. A sample reference trajectory 22 is also illustrated in FIG. 6.

The processor(s) 28 then determines navigational uncertainties with respect to the vehicle's 10 navigation. The navigational uncertainties are based on information acquired by the on-board sensor network 16. In the illustrated embodiment, the navigational uncertainty involves information determination based on impairments to the on-board sensor network 16. When the information detected by the on-board sensor network 16 is determined by the processor(s) 28 to be below a confidence interval or outside of a reference range, the processor(s) 28 can determine one or more navigational constraints to the reference trajectory 22, as will be further discussed. With the navigational constraint control system 18 of the current embodiment, the vehicle 10 is controlled to limit a lateral deviation of the vehicle 10 travel, while also limiting a longitudinal deviation of the vehicle 10 travel based on navigational uncertainties. In other words, the navigational constraint control system 18 controls the vehicle 10 to favor decreasing speed over deviating laterally (e.g., lane change maneuver) in the event of navigational uncertainties.

In the illustrated embodiment, navigational uncertainties can include any one of a map/lane detail uncertainty, localization uncertainty, perception uncertainty, or AD level uncertainty. Map/lane detail uncertainty includes uncertainty with respect to information detected by the environmental sensors 16B with respect to displaying navigation maps or the perceived lanes within the vicinity of the vehicle 10. Map detail uncertainty can include any uncertainty with respect to map details displayed on the display device, whether SD (Standard-Definition) or HD (Standard-Definition) maps. SD maps have low-levels of accuracy with minimal information such as the number of lanes and their connections. HD maps can have centimeter-level accuracy with detailed information regarding road structures such as cross-walks, traffic lights, road gradient, cross slope, curvature, etc.

Therefore, if the vehicle 10 is equipped with a display device that displays only SD maps, then SD maps decreases a confidence level in the information displayed on the SD maps versus information displayed on HD maps. That is, SD maps has a greater likelihood of inaccurate tracking of a hazard's position and velocity relative to the vehicle's 10 intended path. SD maps also have increased false-positive hazard classifications. Therefore, lower quality maps increase the likelihood of navigational uncertainty in the navigational constraint control system 18. Therefore, the processor(s) 28 can determine a greater likelihood of navigational uncertainty in the navigational constraint control system 18 from lower quality maps.

Examples of AD (automated driving) level uncertainty includes uncertainty with respect to quality of the on-board sensor network 16. In particular, AD level uncertainty stems from hardware type and capability with respect to the on-board sensor network 16. For example, more advanced types of vehicle environmental sensors 16B are equipped with redundant, high-quality sensors and accurate perception capabilities. With lower quality the environmental sensors 16B, the processor(s) 28 can determine a greater the likelihood of navigational uncertainty in the navigational constraint control system 18.

Sensor impairment uncertainty includes uncertainty related to environmental conditions (e.g. poor weather, rain, fog, glare), dirt on the environmental sensor(s), wear through long-term use, and overheating, etc. The processor(s) 28 of the navigational constraint control system 18 can compare data or information received from overlapping sensors (e.g., the unidirectional and omnidirectional cameras placed throughout the vehicles 10). The processor(s) 28 can determine discrepancies in the gathered information. If the discrepancies reach a predetermined threshold in terms of the nature of information or quality, the processor(s) 28 can determine a greater the likelihood of navigational uncertainty in the navigational constraint control system 18. In another example, if the processor(s) 28 finds delays or discrepancies in the rate of information gathering by the environmental sensors 16B, the processor(s) 28 can determine a greater the likelihood of navigational uncertainty in the navigational constraint control system 18.

Localization uncertainty includes uncertainty or error when estimating the position of the vehicle 10 based on satellite-based positioning systems (e.g., information from the NAV, TCU or lane keeping assistance systems), odometry, lane detections, comparing the surroundings with the map, etc. Localization uncertainty can increase with poor environmental conditions such as bad weather. For example, GNSS system accuracy for the vehicle 10 can decrease in quality when the vehicle 10 is surrounded by tall buildings or is traveling underground or through a tunnel. Therefore, in poor weather conditions or if the vehicle 10 is traveling underground or surrounded by tall structures, the processor(s) 28 can determine a greater the likelihood of navigational uncertainty in the navigational constraint control system 18. For example, as seen in FIG. 7, navigational error such as localization error gives a reading of the vehicle A and B as if in positions vehicle A' and vehicle B'.

The processor(s) 28 can then determine the level of navigational uncertainty that will trigger navigational constraints to the reference trajectory 22. In particular, the processor(s) 28 can base navigational constraints for the vehicle 10 based on a confidence level of the information received from the on-board sensor network 16, the NAV and/or the TCU. Therefore, the processor(s) 28 is programmed to calculate navigational constraints based on navigational uncertainties that includes at least one of an uncertainty involving information detected by the on-board sensor network 16 and an uncertainty involving information acquired by the on-board navigation device NAV.

Figure 3:
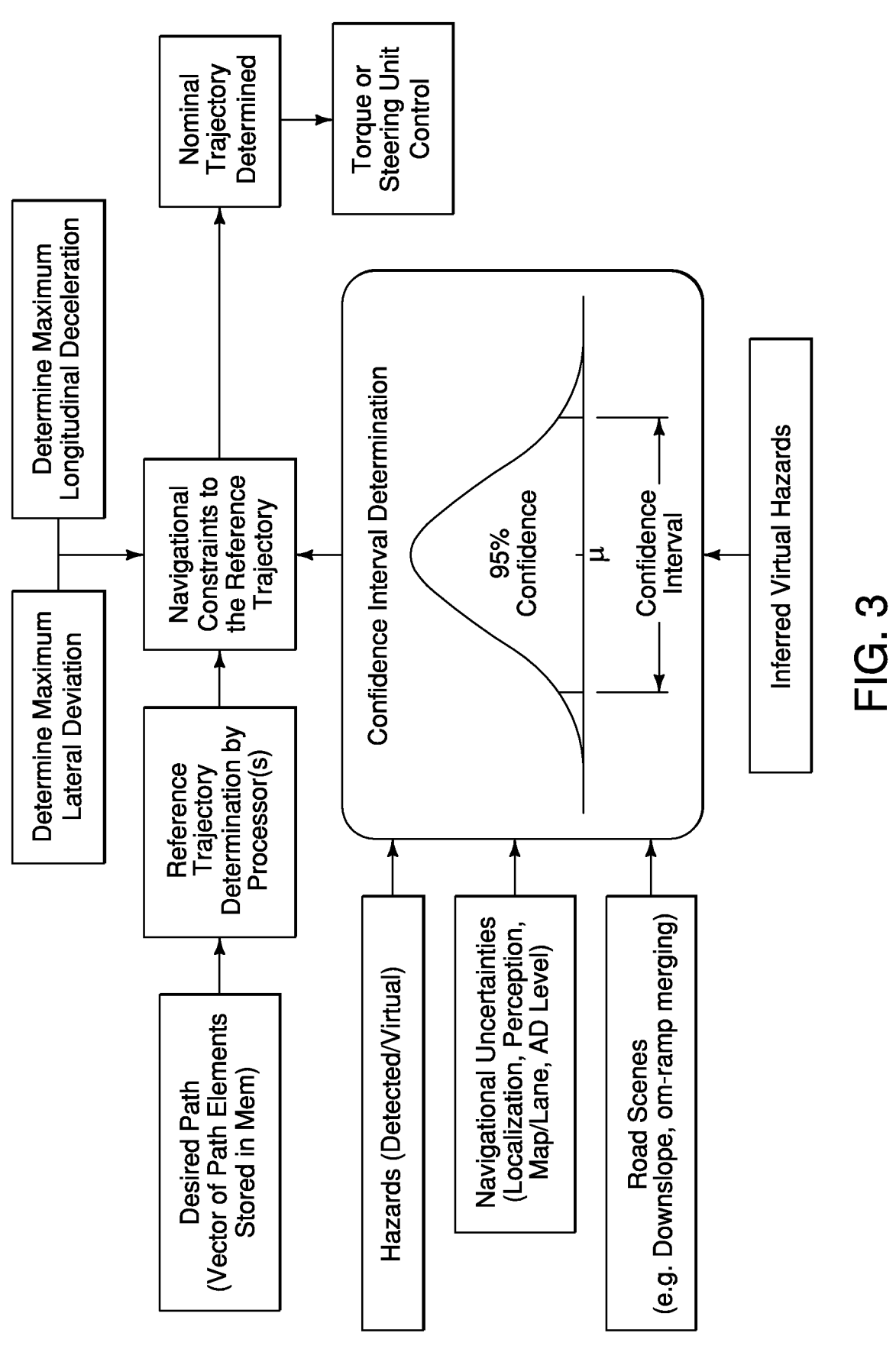
FIG. 3 is a diagrammatic view of the major processes of the navigational constraint control system.

For example, if the readings from the on-board sensor network 16, the NAV and/or the TCU are such that the values of the readings are outside of a certain confidence interval (e.g., a 95% confidence interval) then the processor(s) 28 can determine appropriate longitudinal or lateral constraints for the vehicle 10, as seen in FIG. 3. As best seen in FIG. 6, navigational uncertainties can be determined in terms of directional relationship with respect to the vehicle 10. For example, the navigational uncertainties can be in values of the uncertainties of a longitudinal distance from the vehicle $\delta x$, a lateral distance from the vehicle $\delta y$, and/or a relative heading of the vehicle 80. Therefore, navigational uncertainties can be specified in values of $\pm\delta x$, $\pm\delta y$, and $\pm\delta\theta$ which are shown schematically in FIG. 6 for illustrative purposes.

The processor(s) 28 is programmed to increase the navigational constraints that are applied to the reference trajectory 22 as the navigational uncertainties increase. The navigational constraints include constraints to lateral movement of the vehicle 10 and constraints to longitudinal movement of the vehicle 10. In the event of the localization uncertainty reaching a predetermined threshold (or outside of the confidence interval), the processor(s) 28 can control the ECM and the steering control unit 14 such that a maximum lateral deviation should be limited to within the vehicle's 10 lane limits, which can be detected through its LKA system.

Figure 9:
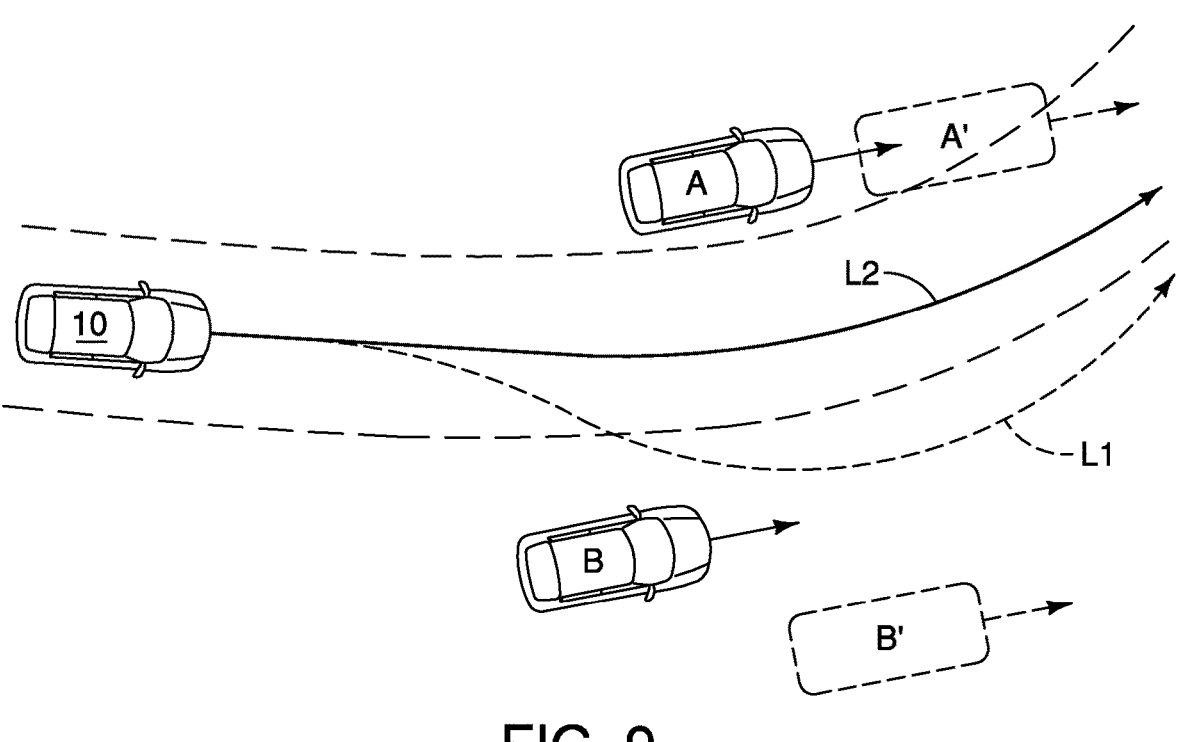
FIG. 9 is a schematic view of a second driving scenario encountered by the vehicle showing navigational constraints determined by the navigational constraint control system.

The processor(s) 28 can increase the maximum lateral deviation of the vehicle 10 when either localization uncertainty decreases or additional inputs are available such as the LKA system detecting available adjacent lanes. For example, as seen in FIG. 9, a maximum lateral deviation from the reference trajectory 22 can differ based on the determined navigational uncertainties.

As shown, the vehicles A and B are detected to be within the vicinity of the vehicle 10. Any one of the navigational uncertainties (localization uncertainty, perception uncertainty, map/lane detail uncertainty and AD level uncertainty) can cause the confidence of the location of the vehicles A and B to be lowered, or the detected location of the vehicles A and B can be within a greater range of error. In FIG. 9, the range of error is shown schematically with the dashed vehicles A' and B' that correspond to the perceived location of the vehicles A and B, respectively. Due to this range of error resulting from the navigation uncertainties, the processor(s) 28 can determine a maximum lateral and longitudinal deviation for the vehicle 10 (shown by path L1) that is greater a maximum lateral deviation (shown by the path L2) that would be based on the actual positions of vehicles A and B.

Figure 4A:
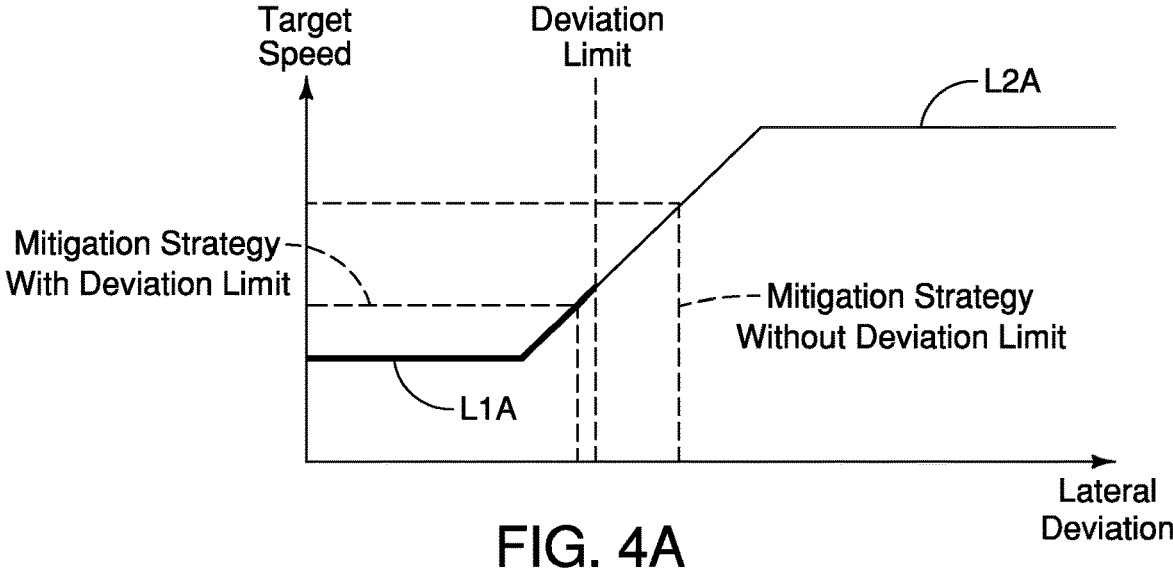
FIG. 4A is a diagrammatic view of a navigational deviation limit control illustrating application of lateral deviation limitation.
Figure 4B:
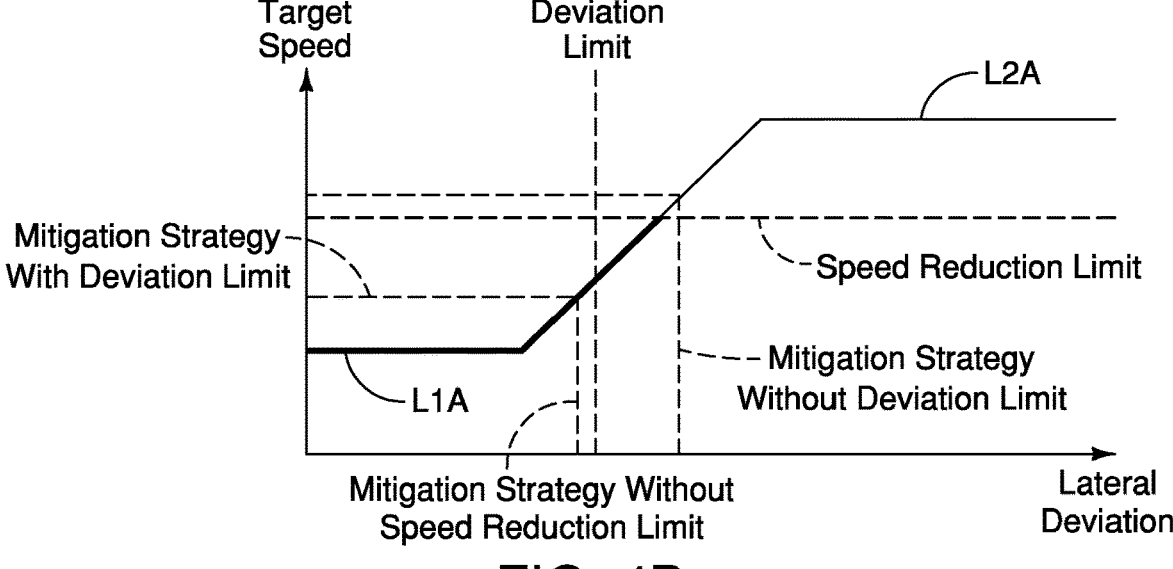
FIG. 4B is a diagrammatic view of a navigational deviation limit control illustrating application of lateral deviation limitation.
Figure 5:
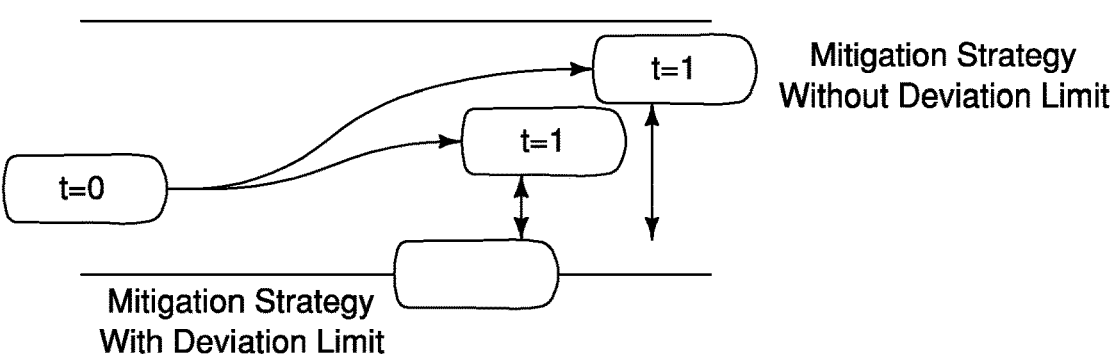
FIG. 5 is a diagrammatic view of a conventional vehicle navigational control with and without the limit control of FIG. 4.

Referring to FIGS. 4 and 5, the navigational constraints will be further discussed. The processor(s) 28 determine a maximum lateral deviation limit that is determined based on the navigational uncertainties. The processor(s) 28 also determine a maximum longitudinal deceleration limit that is based on the navigational uncertainties. That is, the processor(s) 28 control the vehicle 10 to limit how far the vehicle 10 can mitigate laterally and longitudinally.

As shown in FIGS. 4A and 4B, the processor(s) can control the vehicle 10 to navigate in accordance with L1 to mitigate lane incursion risks based on the navigational uncertainties. Therefore, L1 represents a range of proactive speed and lateral deviation that can be taken to successfully mitigate lane incursion risks. The navigational constraint system 18 can control the vehicle 10 such that the processor(s) establish a maximum lateral deviation limit and a maximum longitudinal deviation limit. L1A represents a maximum deviation value and L2A represents inaccessible deviations. Therefore, the vehicle 10 is controlled to limit the lateral deviation of the vehicle 10, such as shown in FIG. 5. As a result, if the optimum value of the vehicle speed and lateral deviation exceeds the determined maximum lateral deviation threshold, vehicle 10 will be controlled in accordance with the maximum lateral deviation limit as well as the target speed. Therefore, the navigational constraint system 18 controls the vehicle 10 to limit lateral deviation by further reducing speed (increasing deceleration). [You May Need Array of Speed Versus Lateral Deviation Distance Prestored]

For example, as shown in FIG. 5, the vehicle 10 comes across a parked vehicle 10' and the virtual hazard inference system 20 determines that the vehicle 10' might incur into the navigation path (e.g., the vehicle 10' might move or open its door). A conventional vehicle may deviate laterally (move to the next lane) rather than slow down. That is, the vehicle 10 has determined that due to the poor perception external to the vehicle 10 due to the navigational uncertainties, it is safer to slow down rather than to deviate laterally.

Therefore, the processor(s) 28 then determine the vehicle's 10 nominal trajectory 24 based on the navigational constraints. Therefore, the processor(s) 28 is further programmed to calculate navigational constraints for the determined reference trajectory 22 to determine the nominal trajectory 24 based on information detected by the on-board sensor network 16. That is, the processor(s) calculate a maximum lateral deviation value for the vehicle and a maximum longitudinal deceleration value. As stated, the processor(s) are programmed to limit the vehicle 10 both laterally and longitudinally (e.g., reduce speed but do not deviate from the current lane) in the event of navigational uncertainties. The maximum lateral and longitudinal deviation values are used to limit the lateral deviation values and the longitudinal speeds (speed limits), which are then used to determine the nominal trajectory 24 of the vehicle 10.

In the illustrated embodiment, the nominal trajectory 24 is the modified path after the reference trajectory 22 has been modified in view of calculated navigational constraints that are determined based on navigational uncertainties.

The processor(s) 28 is further programmed to control at least one of the vehicle engine 12 and the steering control unit 14 in accordance with the nominal trajectory 24. Therefore, the processor(s) 28 is programmed to send command signals to the ECM and the steering control unit 14 to control the vehicle 10 to travel along the nominal trajectory 24. The command signals for the processor(s) 28 nominal trajectory 24 can be a series of vectors such as the path index vector values for the steering control unit 14. In addition, the command signals can also be yaw control signals. The command signals can also be speed, velocity or acceleration control signals to control the torque output of the engine 12. In FIG. 6, the nominal trajectory 24 is illustrated as schematic paths or trajectories for illustrative purposes.

Figure 10:
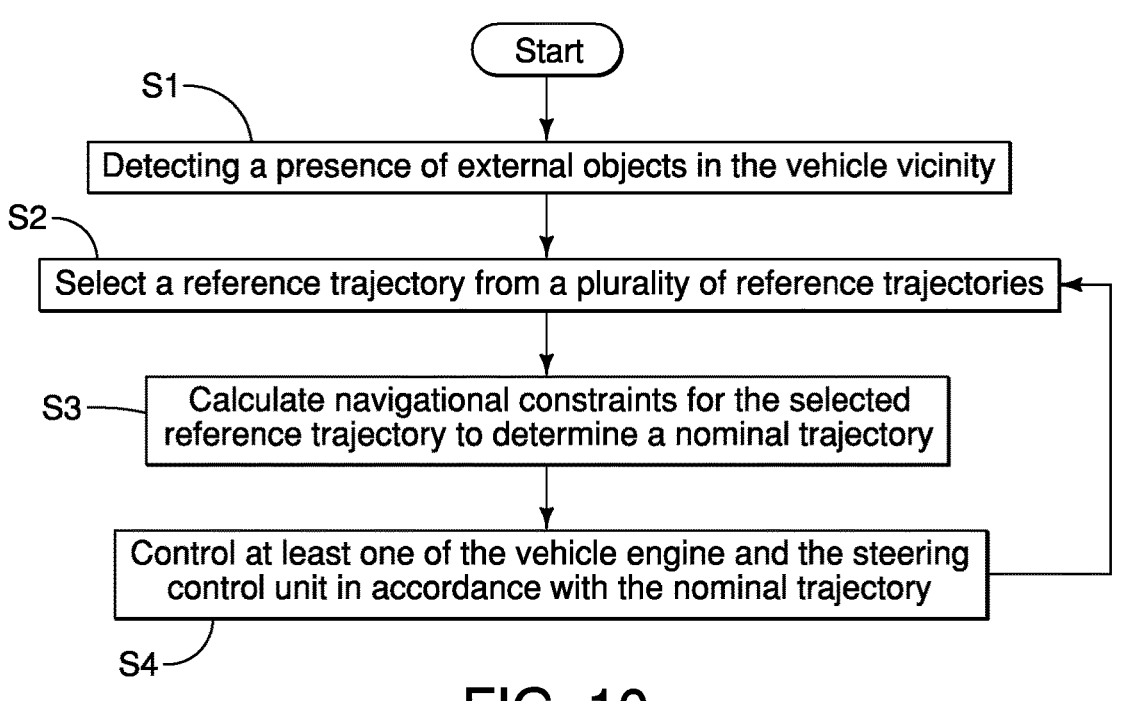
FIG. 10 is a flowchart of some of the processes of the navigational constraint control system.

Referring now to FIG. 10, a method for controlling the vehicle based on navigational constraints will now be described. The method can be executed by the components and the processor(s) 28 of the navigational constraint control system 18. In step S1, the method comprises detecting a presence of external objects E within a detection zone by the on-board sensor network 16. In step S2, the processor(s) 28 select a reference trajectory 22 from a plurality of reference trajectories. The selection is based on information detected by the on-board sensor network 16. In step S3, the processor(s) 28 calculates navigational constraints for the selected reference trajectory 22 to determine a nominal trajectory 24 for the vehicle 10.

In the illustrated embodiment, the processor(s) 28 calculates the navigational constraints based on navigational uncertainties. As stated, the navigational uncertainties include at least one of uncertainty involving information detected by the on-board sensor network 16 and uncertainty involving information acquired by the NAV. As described above, uncertainty involving information detected by the on-board sensor network 16 is determined based on impairments to the on-board sensor network 16. Uncertainty involving information acquired by the on-board navigation device is also determined based on impairments to the NAV and/or the TCU.

That is, the navigational uncertainties are determined when the information detected by the on-board sensor network 16 is determined by the processor(s) 28 to be below a confidence interval or outside of a reference range. The navigational uncertainties are determined when the information detected by the NAV and/or the TCU is determined by the processor(s) 28 to be below a confidence interval or outside of a reference range. In the illustrated embodiment, the processor(s) 28 is programmed to increase the navigational constraints that are applied to the reference trajectory 22 as the navigational uncertainties increase.

In step S4, the processor(s) 28 control at least one of the vehicle engine 12 and the steering control unit 14 in accordance with the nominal trajectory 24. That is, the processor(s) 28 constrains at least one of a lateral movement of the vehicle 10 and a longitudinal movement of the vehicle 10.

Figure 11:
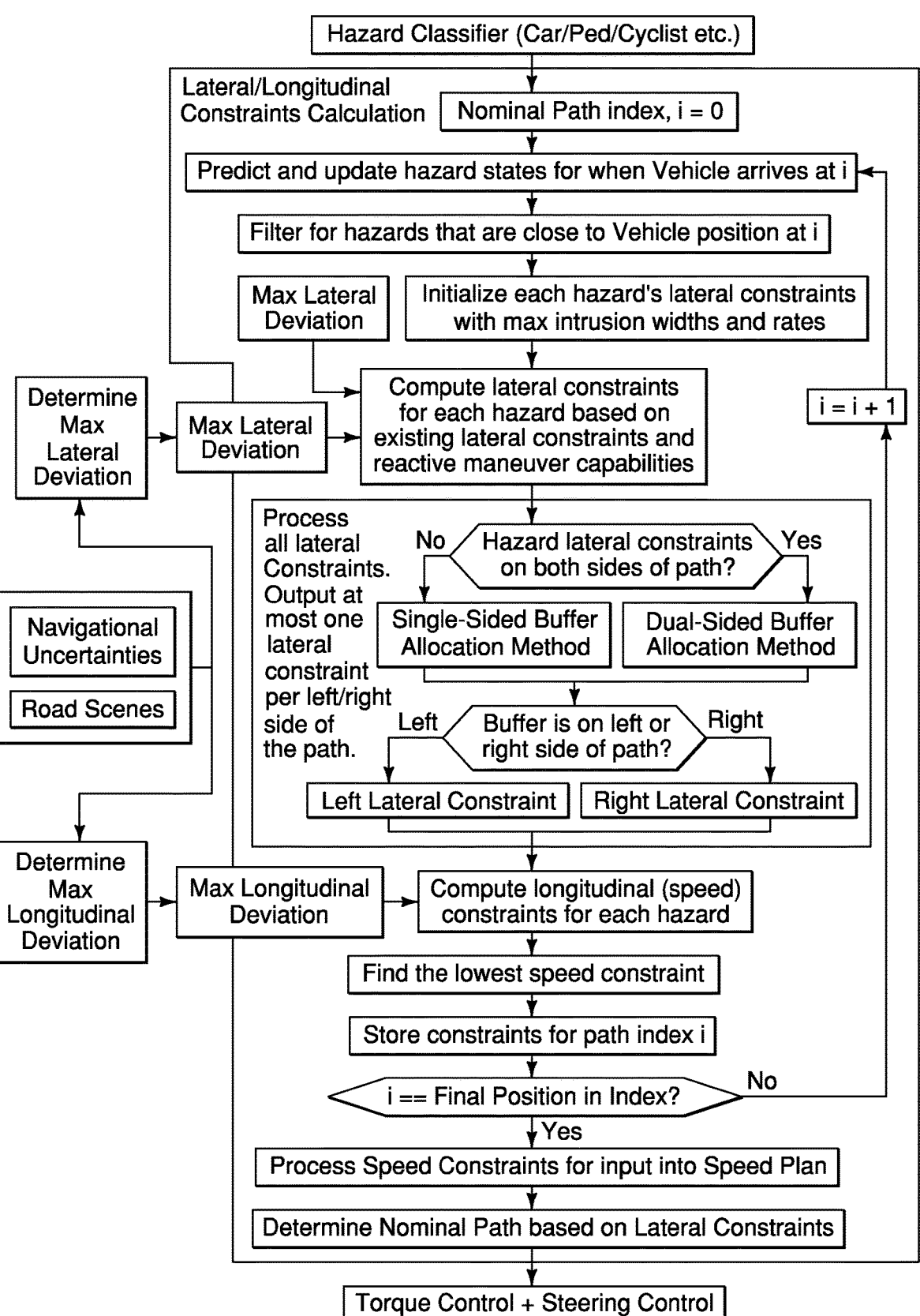
FIG. 11 is an algorithm executed by the components of the navigational constraint control system.

Referring now to FIG. 11, an algorithm for controlling the vehicle based on navigational constraints will now be described. The algorithm can be executed by the components and the processor(s) 28 of the navigational constraint control system 18. As shown, the hazard classifier of the virtual hazard inference system 20 can send information regarding the classified hazards (both virtual and/or detected) to a navigational constraint calculation module of the navigational constraint control system 18. The navigational constraint calculation module calculates the lateral and longitudinal constraints to a reference trajectory 22 (based on the prestored path index). The navigational constraint calculation module calculates the constraints based on detected or inferred hazards determined by the virtual hazard inference system 20. The variable risk mitigation control disclosed in the algorithm can be similar to navigational control disclosed in U.S. Patent Application Publication No. 20210031760.

Figure 12:
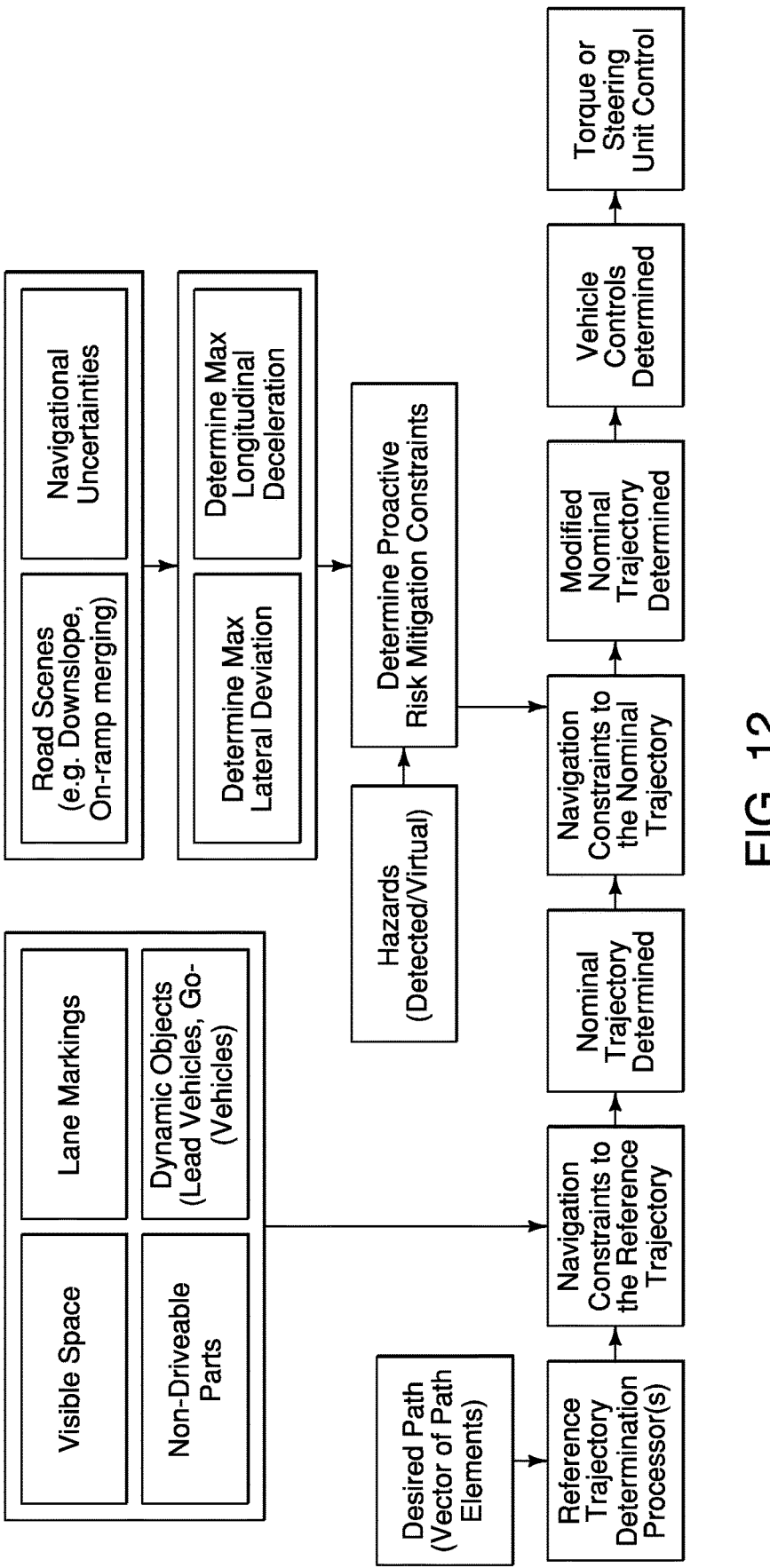
FIG. 12 is a diagrammatic view of alternative major processes of the navigational constraint control system.

Referring now to FIG. 12,

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the navigational constraint control system. Accordingly, these terms, as utilized to describe the present invention should be interpreted relative to a vehicle equipped with the navigational constraint control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
a vehicle engine generating a torque output of the vehicle;
a steering control unit controlling a steering angle of the vehicle;
an on-board sensor network programmed to detect external objects within a detection zone; and
a navigational constraint control system having a memory and a processor, the memory storing a path index for the vehicle's navigation, the processor being programmed to determine a reference trajectory from the path index, the processor being further programmed to calculate navigational constraints for the determined reference trajectory to determine a nominal trajectory by filling in virtual objects occluded from detection and establishing a maximum lateral deviation limit and a maximum longitudinal deviation limit based on a confidence level of information detected by the on-board sensor network for controlling both lateral deviation and speed of the vehicle in an event of navigational uncertainty,
the processor further being programmed to control both the vehicle engine and the steering control unit in accordance with the nominal trajectory such that when an optimum value for the speed and the lateral deviation exceeds the maximum lateral deviation limit, the processor controls the vehicle engine and the steering control unit in accordance with both the maximum lateral deviation limit and the maximum longitudinal deviation limit.

2. The vehicle according to claim 1, further comprising an on-board satellite navigation device in communication with a global positioning system unit to acquire real-time information regarding conditions near the vehicle's vicinity.

3. The vehicle according to claim 2, wherein the processor is programmed to calculate navigational constraints based on navigational uncertainties that includes at least one of an uncertainty involving information detected by the on-board sensor network and an uncertainty involving information acquired by the on-board navigation device.

4. The vehicle according to claim 3, wherein uncertainty involving information detected by the on-board sensor network is determined based on impairments to the on-board sensor network in which the information detected by the on-board sensor network is determined by the processor to be below a confidence interval or outside of a reference range.

5. The vehicle according to claim 3, wherein uncertainty involving information acquired by the on-board navigation device is determined based on impairment to the on-board navigation device in which the information detected by the on-board navigation device is determined by the processor to be below a confidence interval or outside of a reference range.

6. The vehicle according to claim 3, wherein the processor increases the navigational constraints that are applied to the reference trajectory as the navigational uncertainties increase.

7. A method for controlling a vehicle based on navigational constraints, the method comprising:
    detecting a presence of external objects within a detection zone by an on-board sensor network;
    determining a reference trajectory by a processor from a prestored path index;
    calculating navigational constraints for the determined reference trajectory by filling in virtual objects occluded from detection and establishing a maximum lateral deviation limit and a maximum longitudinal deviation limit for controlling both lateral deviation and speed of the vehicle in an event of navigational uncertainty based on a confidence level of information detected by the on-board sensor network to determine a nominal trajectory by the processor; and
    controlling both a vehicle engine and a steering control unit in accordance with the nominal trajectory and both the maximum lateral deviation limit and the maximum longitudinal deviation limit when an optimum value for the speed and the lateral deviation exceeds the maximum lateral deviation limit.

8. The method according to claim 7, further comprising calculating navigational constraints by the processor based on navigational uncertainties that includes at least one of an uncertainty involving information detected by the on-board sensor network and an uncertainty involving information acquired by an on-board navigation device.

9. The method according to claim 8, wherein uncertainty involving information detected by the on-board sensor network is determined based on impairments to the on-board sensor network in which the information detected by the on-board sensor network is determined by the processor to be below a confidence interval or outside of a reference range.

10. The method according to claim 8, wherein uncertainty involving information acquired by the on-board navigation device is determined based on impairment to the on-board navigation device in which the information detected by the on-board navigation device is determined by the processor to be below a confidence interval or outside of a reference range.

11. The method according to claim 8, further comprising increasing the navigational constraints that are applied to the reference trajectory as the navigational uncertainties increase.

12. The vehicle according to claim 1, wherein the processor is programmed to fill in the virtual objects occluded from detection based on the information detected by the on-board navigation device being outside a confidence interval.

13. The vehicle according to claim 1, wherein the navigational constraint control system controls the vehicle to favor decreasing speed over deviating laterally when determining the nominal trajectory.

14. The vehicle according to claim 1, wherein the processor is programmed to fill in the virtual objects occluded from detection within a region of interest.

15. The vehicle according to claim 1, wherein the navigational constraint control system is configured to determine the reference trajectory based on vector values in the path index.

16. The vehicle according to claim 1, wherein the navigational constraint control system is configured to decrease the confidence level based on uncertainty regarding a map displayed on a display.

17. The vehicle according to claim 1, wherein the maximum lateral deviation limit includes a lane limit.

18. The method according to claim 7, wherein the maximum lateral deviation limit includes a lane limit.

19. The method according to claim 7, wherein controlling both the vehicle engine and the steering control unit includes favoring decreasing speed over deviating laterally.

20. The method according to claim 7, wherein filling in virtual objects occluded from detection includes filling in the virtual objects based on the information detected by the on-board navigation device being outside a confidence interval.

\* \* \* \* \*